(No Model.) 2 Sheets—Sheet 2.
G. H. ELLIS & J. F. STEWARD.
MOTOR FOR HARVESTING MACHINERY.
No. 577,105. Patented Feb. 16, 1897.
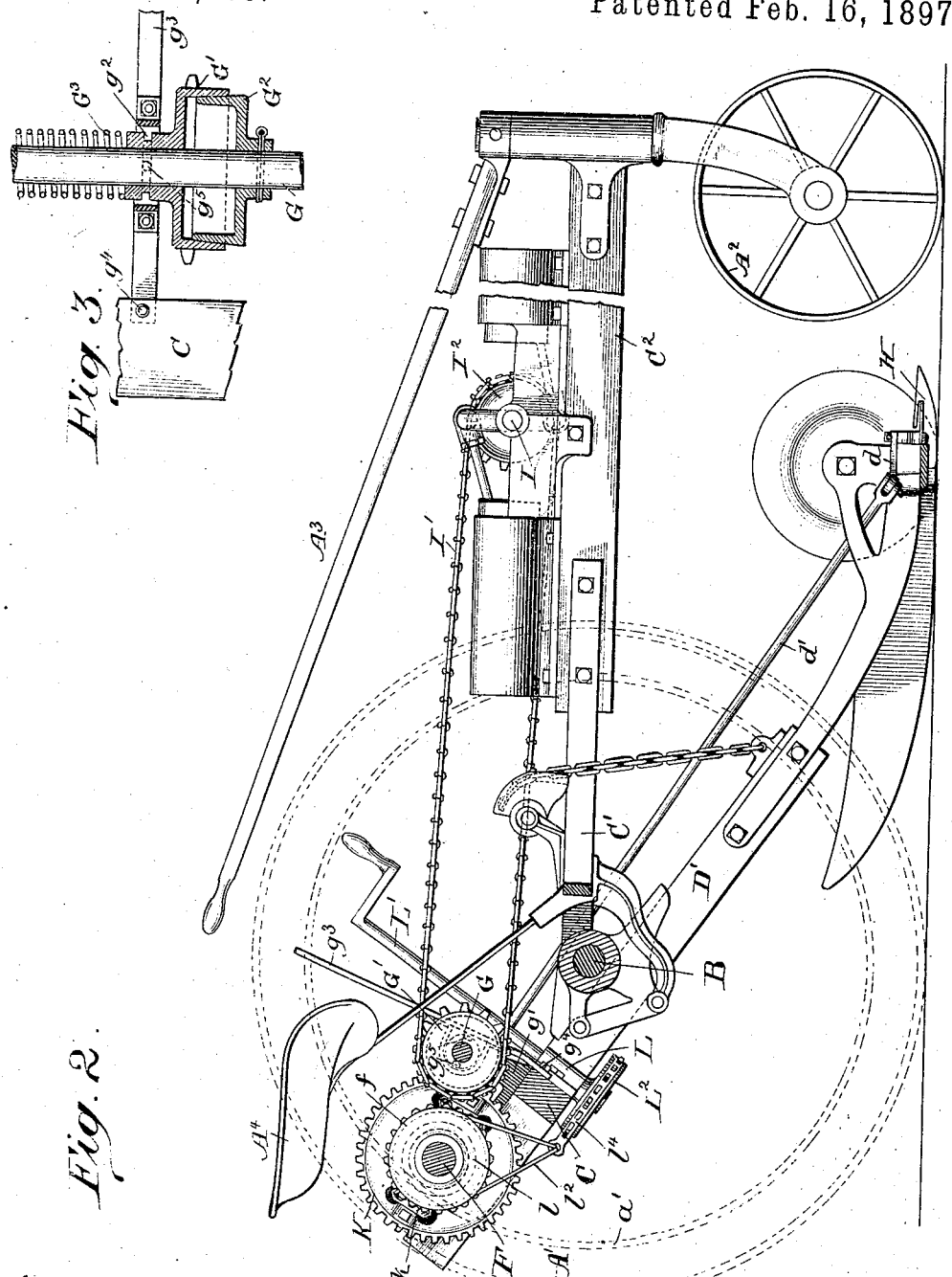
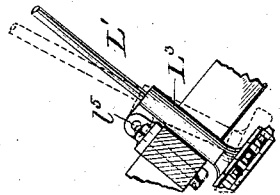
Witnesses
Arthur Johnson
Chas. A. Steward
Inventors.
George H. Ellis
John F. Steward

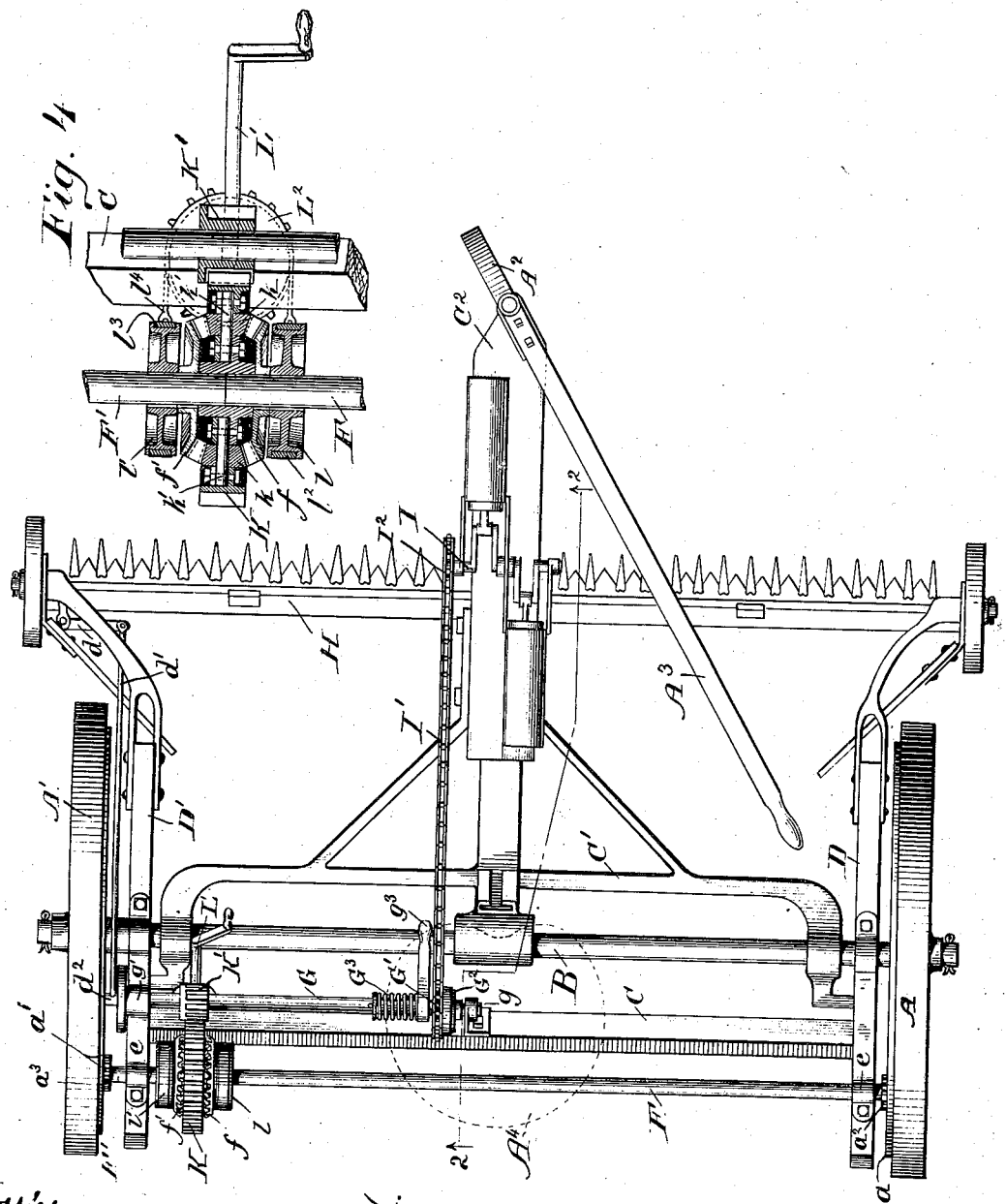

UNITED STATES PATENT OFFICE.

GEORGE H. ELLIS AND JOHN F. STEWARD, OF CHICAGO, ILLINOIS, ASSIGNORS TO THE DEERING HARVESTER COMPANY, OF SAME PLACE.

MOTOR FOR HARVESTING MACHINERY.

SPECIFICATION forming part of Letters Patent No. 577,105, dated February 16, 1897.

Application filed April 13, 1896. Serial No. 587,292. (No model.)

*To all whom it may concern:*

Be it known that we, GEORGE H. ELLIS and JOHN F. STEWARD, of Chicago, in the county of Cook and State of Illinois, have invented certain new and useful Improvements in Motors for Harvesting Machinery, of which the following is a full description, reference being had to the accompanying drawings, in which—

Figure 1 is a plan view. Fig. 2 is a side elevation of the machine, shown as if cut on the line 2 2 of Fig. 1. Fig. 3 is a sectional detail of the clutching devices. Fig. 4 is a detail of the differential gearing through which the machine is propelled by the power of an engine, and Fig. 5 is a detail of the brake mechanism.

We have adapted our invention to that class of mowing-machines in which the cutting apparatus is placed in advance of the main supporting-wheels.

A and A' are the main supporting-wheels, and $A^2$ a third wheel placed some distance from the axle B of the main supporting-wheels. We prefer to place it at the forward part of the machine, but it may be at rear. The main frame is supported upon the axle B in any convenient manner and consists of the parts C, C', and $C^2$.

D and D' are forward-reaching arms pivotally secured to the axle B. They extend backward, having journal-bearings $e$ for the shafts F and F' and forward to the finger-bar H, which may be secured to them in any of the well-known ways.

Upon the bar C is the journal-bearing $g$ for the shaft G.

$g'$ is a journal-bearing for the shaft G, adjacent to the wheel A'.

To the forward portion of the arm D' is supported a bell-crank $d$, and to this is secured the pitman $d'$, the latter also connected at $d^2$ to a crank formed on or secured to the shaft G.

As far as described the machine is of a well-known kind, except in the matter of making the two shafts F and F' end to end, where but a single shaft has been used heretofore. As this machine is propelled the wheel $A^2$ is made a steering-wheel and is placed beneath the forwardly-reaching member $C^2$ of the frame, the stem of the caster-wheel extending rearward and receiving the lever $A^3$, that extends back within reach of the driver when in his seat $A^4$.

Upon the bar $C^2$ we place, preferably, an oil-engine. We have shown only so much, however, of the latter as to make our present invention clear. The engine itself will form the subject-matter of another application. It is sufficient for the present to say that I is the shaft of an engine or other suitable motive power.

The chain I' is thrown around the sprocket-wheel $I^2$ on the shaft I and around the sprocket-wheel G', loosely supported on the shaft G. Upon the same shaft (see Fig. 3) is the frustum of a cone $G^2$. Against the hub of the sprocket-wheel presses the spring $G^3$. The hub of the sprocket-wheel G' is provided with a groove $g^2$.

$g^3$ is a lever pivoted at $g^4$ to the main frame-bar C. Upon this lever are pins $g^5$, (shown in dotted lines in Fig. 2,) that rest in the groove $g^2$ of the hub of the sprocket-wheel. The inner surface of the rim of the sprocket-wheel G' is made conical to correspond with the surface of the frustum of a cone $G^2$. As the latter is rigidly secured to the shaft it is clear that if the lever be thrown to the position shown in Fig. 3 the clutch will, because of the friction between the two conical surfaces, turn the part $G^2$ and hence the shaft G. These parts form a friction-clutch of an ordinary kind. It is usually desirable to stop the forward movement of the machine and its parts without stopping the engine. This friction-clutch permits us to do so and to start the engine and its parts when desired without shock. With the shaft G in motion the cutting apparatus is given the desired movements.

In order that the machine may be turned, a differential-gearing arrangement is applied, whereby the driving power of the engine will be exerted in moving the driving-wheels at independent rates of speed. This is brought about in a very common manner. Upon the shaft F' is rigidly secured the bevel-gear $f'$. Upon the shaft F is secured the bevel-gear $f$. Loosely supported upon the two shafts is the gear K, the said two shafts preferably abutting against each other near the middle of the hub thereof. This gear is secured to neither shaft. In recesses formed in the web of the gear, as shown in Fig. 2, are placed bevel-pinions $k$, journaled upon the pins $k'$. Upon the shaft G is secured the pinion $K'$, adapted to mesh with the gear K. As the gear K is rotated its motion is imparted to the bevel-gears $f$ and $f'$ and by them to the shafts F and F'. If either of the main supporting-wheels is unduly resisted, as in turning, the gear K imparts motion through the pinions $k$ to the other bevel-gear. As far as now described this differential-gear arrangement is like that used on various traction-engines.

In operating a harvesting-machine in the field it is desirable to turn square corners. In order to accomplish this, we have provided means whereby either of the main supporting-wheels may be held from rotating and the power of the engine directed to the other one of the main supporting-wheels and thus the machine be forced to turn by the power of the engine. We have chosen as the most convenient means for accomplishing this end the placement upon the shaft F of a brake-wheel $l$ and upon the shaft F' the brake-wheel $l'$. We place around each of these brake-wheels straps $l^2$ and $l^3$. These straps lie in grooves of the said wheel and nearly surround them. Each one is connected to one end of the strap $l^4$, which may be, if desired, a short piece of chain. Suitably supported upon the bar C in the bearing L is the shaft L', having a suitable crank at its upper end. At the lower end of this shaft is secured the sprocket-wheel $L^2$ and around it the strap or link belt $l^4$. By referring to Fig. 4 it will be readily understood that if the crank be pressed in one direction the brake will be applied to the wheel $l$ and if moved in the other direction applied to the wheel $l'$.

In going over the field the operator controls the machine through the instrumentality of the lever $A^3$. Reaching the right point for turning at the corner of the field he grasps the crank-shaft L' and applies the brake to either one of the brake-wheels that he may choose, his choice depending upon which way he wishes to turn. Let us suppose that he wishes to turn on the wheel A' as a pivot. He applies the brake to the shaft F' and checks its motion. The power of the engine is then all imparted to give rotation to the wheel A and the machine thus given the desired turn. When fully turned, the brake is released from the wheel $l'$, the caster-wheel brought to a position parallel with the main supporting-wheels, and the operation of cutting continued.

Within the main supporting-wheels are the internal gears $a$ and $a'$ and upon the shafts F and F' are the pinions $a^2$ and $a^3$, said pinions adapted to mesh in said gears. The motion imparted to the shafts F and F' is transmitted to the said supporting-wheels, which makes them, in fact, driving-wheels. If the operator wishes to stop his machine, he moves the lever $g^3$ to the left and throws the parts of the friction-clutch out of engagement with each other. The parts of the clutches may be held asunder in any suitable manner.

In Fig. 5 is shown a modification of the brake mechanism. The hand-shaft L' is shown as journaled in a bracket $L^3$, that is pivoted at $l^5$ upon the frame C instead of being secured thereto. By these means we are enabled to force the said shaft backward, thus moving the sprocket-wheel $L^2$ forward and putting a braking stress upon both of the brake-wheels $l$ and $l'$ in order to stop the machine when desired. With such a construction it will be necessary, when operating the brake mechanism for turning corners, as hereinbefore described, to press forwardly upon the hand-crank of the shaft L' when putting a braking stress upon either of the brake-wheels, which is convenient to do, because it will be understood that comparatively little movement of the shaft L' upon its axis is necessary in order to put a braking stress upon either of the brake-wheels when required to turn corners.

What we claim as our invention, and desire to secure by Letters Patent, is—

1. The combination in a harvester of the supporting-wheels, the main frame and the cutting apparatus, with a motor, a crank-shaft and means for transmitting rotation from said motor to said crank-shaft, and a clutch for disconnecting said crank-shaft from said motor, the said crank-shaft adapted to actuate the cutting apparatus and means whereby the machine is moved along the ground, said means consisting of two shafts having coincident axes, differential gearing mounted on the adjacent ends of said shafts and connected by gearing to said crank-shaft, the said shafts being adapted to transmit rotation to said carrying-wheels, suitable brake mechanism upon the two said shafts and a hand-shaft connected to both parts of the said brake mechanism whereby the rotation in one direction of said hand-shaft serves to stop or delay one of said main wheels, and by a rotation in the opposite direction serves to stop or delay the other said main wheel, without affecting the speed of the cutting apparatus, substantially as described.

2. The combination in a harvester of the supporting-wheels, the main frame and the cutting apparatus, with a motor, a crank-shaft and means for transmitting rotation from said motor to said crank-shaft, the said crank-shaft adapted to actuate the cutting apparatus and means whereby the machine is moved along the ground, said means consisting of two shafts having coincident axes, differential gearing mounted on the adjacent ends of said shafts and connected by gearing to said crank-shaft, the said shafts being adapted to transmit rotation to said carrying-wheels, suitable brake mechanism upon the two said shafts and a hand-shaft connected to both parts of the said brake mechanism whereby the rotation in one direction of said hand-shaft serves to stop or delay one of said main wheels, and by a rotation in the opposite direction serves to stop or delay the other said main wheel, without affecting the speed of the cutting apparatus, substantially as described.

3. The combination in a harvesting-machine of a motor, the supporting-wheels, two shafts each suitably connected by gearing to said supporting-wheels, differential gearing supported on the adjacent ends of said shafts, suitable brake-wheels secured to said shafts, brake-straps engaging the peripheries of said brake-wheels, a hand-shaft and means connecting said brake-straps with said hand-shaft, and a bearing for said hand-shaft pivoted upon the main frame of the machine whereby said hand-shaft can be rotated upon its axis in either direction to apply a braking stress to either of said brake-wheels, or can be moved bodily rearward upon its pivoted bearing to apply a braking stress to both of said brake-wheels, substantially as described.

GEORGE H. ELLIS.
JOHN F. STEWARD.

Witnesses:
ARTHUR JOHNSON,
CHAS. A. STEWARD.